(12) United States Patent
Tanabe

(10) Patent No.: US 8,332,056 B2
(45) Date of Patent: Dec. 11, 2012

(54) COMMUNICATION CONTROL APPARATUS

(75) Inventor: Akihiro Tanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 206 days.

(21) Appl. No.: 12/600,581

(22) PCT Filed: Jun. 23, 2008

(86) PCT No.: PCT/JP2008/061785
§ 371 (c)(1),
(2), (4) Date: Nov. 17, 2009

(87) PCT Pub. No.: WO2009/008272
PCT Pub. Date: Jan. 15, 2009

(65) Prior Publication Data
US 2010/0152913 A1    Jun. 17, 2010

(30) Foreign Application Priority Data

Jul. 12, 2007    (JP) .................. 2007-182953

(51) Int. Cl.
G05B 11/01    (2006.01)
G05B 23/02    (2006.01)
G09B 21/00    (2006.01)
H04B 1/20    (2006.01)

(52) U.S. Cl. .......... 700/22; 340/3.9; 340/4.11; 340/4.42
(58) Field of Classification Search ............. 340/3.9, 340/4.11, 4.42; 700/22
See application file for complete search history.

(56) References Cited

U.S. PATENT DOCUMENTS

| | | | | |
|---|---|---|---|---|
| 5,091,938 A | * | 2/1992 | Thompson et al. | 380/239 |
| 5,541,489 A | * | 7/1996 | Dunstan | 320/134 |
| 5,565,855 A | * | 10/1996 | Knibbe | 340/3.51 |
| 5,576,700 A | * | 11/1996 | Davis et al. | 340/3.31 |
| 5,689,242 A | * | 11/1997 | Sims et al. | 340/652 |
| 5,757,777 A | * | 5/1998 | Tanaka | 370/248 |
| 6,122,350 A | * | 9/2000 | Reeder et al. | 379/102.04 |
| 6,459,175 B1 | * | 10/2002 | Potega | 307/149 |
| 6,476,728 B1 | * | 11/2002 | Sakakibara | 340/870.02 |
| 6,741,916 B1 | * | 5/2004 | Sekiguchi et al. | 700/292 |

(Continued)

FOREIGN PATENT DOCUMENTS

JP    1987-117853 A    7/1987

(Continued)

OTHER PUBLICATIONS

Harris et al., "A Combined PLC and CPU Approach to Multiprocessor Control" IEEE, 1995, p. 874-877.*

(Continued)

*Primary Examiner* — Charles Kasenge
*Assistant Examiner* — Thomas Stevens
(74) *Attorney, Agent, or Firm* — Cowan, Liebowitz & Latman, P.C.

(57) ABSTRACT

A communication control apparatus includes a first connection unit connecting to a power line, a second connection unit to which an external apparatus is connected, a power supply unit for supplying electric power to the external apparatus via the second connection unit, a communication unit for making the communication between a communication apparatus connected to the power line and the external apparatus via the first connection unit and the second connection unit, and a control unit for controlling the power supply unit to supply electric power to the external apparatus, based on information received from the external apparatus by the communication unit.

14 Claims, 9 Drawing Sheets

U.S. PATENT DOCUMENTS

| | | | |
|---|---|---|---|
| 6,832,118 B1 * | 12/2004 | Heberlein et al. | 700/18 |
| 6,838,978 B2 * | 1/2005 | Aizu et al. | 340/286.02 |
| 6,992,592 B2 * | 1/2006 | Gilfix et al. | 340/4.11 |
| 7,139,591 B2 * | 11/2006 | Callaghan et al. | 455/557 |
| 7,821,379 B2 * | 10/2010 | Cafiero et al. | 370/395.2 |
| 7,978,048 B2 * | 7/2011 | Ueno et al. | 340/5.22 |
| 8,027,752 B2 * | 9/2011 | Castaldo et al. | 700/296 |
| 2003/0163714 A1 * | 8/2003 | Nortung | 713/189 |
| 2004/0254654 A1 * | 12/2004 | Donnelly et al. | 700/22 |
| 2006/0193110 A1 * | 8/2006 | Chan et al. | 361/683 |
| 2007/0245012 A1 * | 10/2007 | Ewing et al. | 709/223 |
| 2008/0030299 A1 * | 2/2008 | Beck | 340/5.1 |
| 2008/0168205 A1 * | 7/2008 | McCoy et al. | 710/304 |
| 2009/0313486 A1 * | 12/2009 | Tani | 713/300 |

FOREIGN PATENT DOCUMENTS

| | | |
|---|---|---|
| JP | 2003-110471 A | 4/2003 |
| JP | 2003-244866 A | 8/2003 |
| JP | 2004-007497 A | 1/2004 |
| JP | 2004-134920 A | 4/2004 |

OTHER PUBLICATIONS

PCT/IPEA/416 (Notification of Transmittal of International Preliminary Report on Patentability) and PCT/IPEA/409 (International Preliminary Report on Patentability), 4 pg.

\* cited by examiner

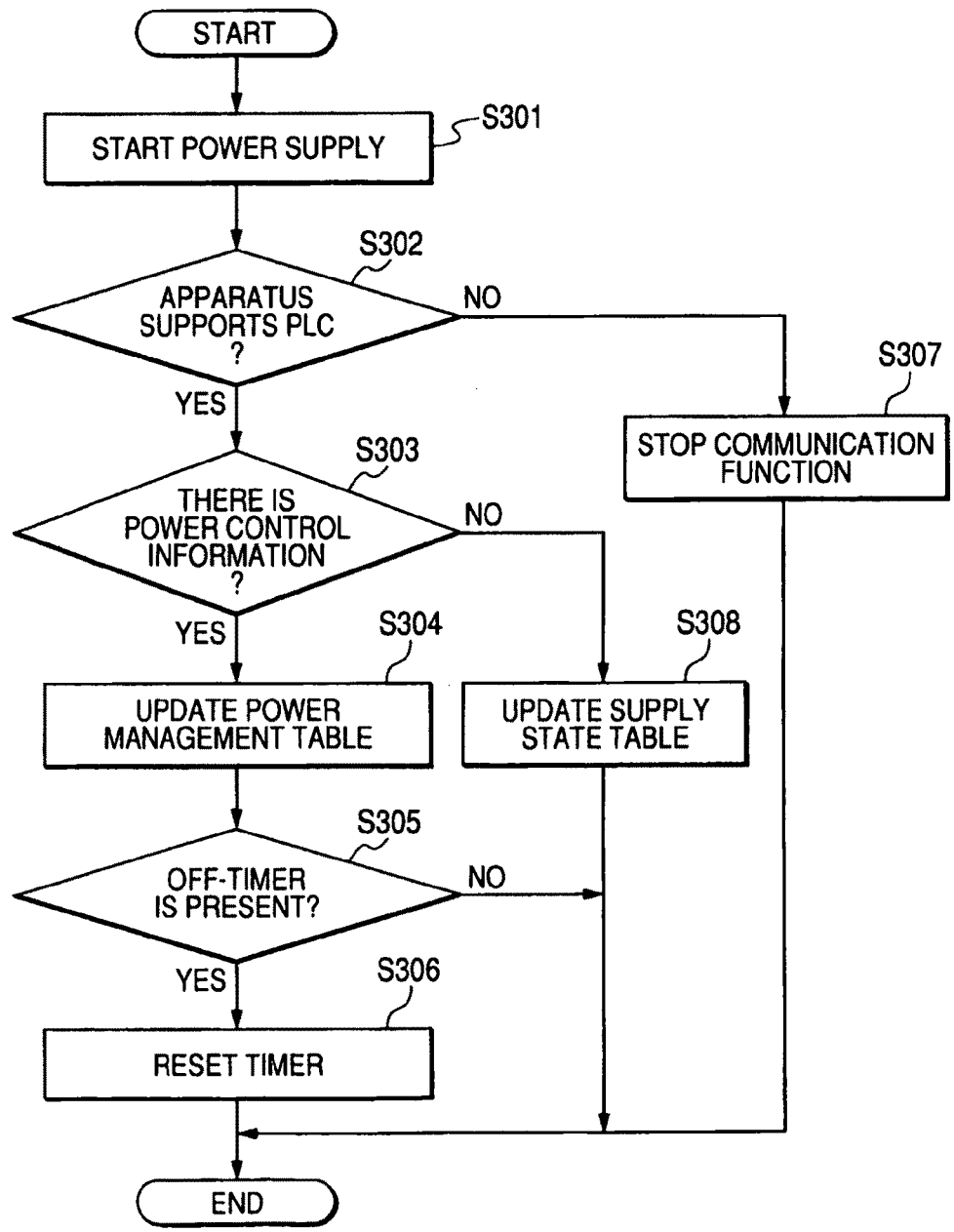

| PORT | APPARATUS NAME | CONTROLLABLE OR NOT | OFF-TIMERT | POWER SUPPLY STOP CONDITION | NECESSITY OF REGULAR POWER SUPPLY? | END NOTIFICATION |
|---|---|---|---|---|---|---|
| A | HDD | YES | 30 MINUTES | STOP AFTER 5 SECONDS FROM STOP REQUEST | UNNECESSARY | NONE |
| B | MONITOR CAMERA | NO | NONE | NONE | NONE | PRESENT |
| C | TV | YES | NONE | IMMEDIATELY STOPPABLE | UNNECESSARY | NONE |
| D | PRINTER | YES | NONE | STOP AFTER 10 SECONDS FROM STOP REQUEST | SUPPLY EVERY 30 DAY | NONE |

420

| PORT | IP ADDRESS | POWER SUPPLY | MAC ADDRESS |
|---|---|---|---|
| A | 111.111.000.001 | SUPPLYING | AA-AA-AA-AA-AA |
| B | 111.111.000.002 | SUPPLYING | BB-BB-BB-BB-BB |
| C | 111.111.000.003 | SUPPLYING | CC-CC-CC-CC-CC |
| D | 111.111.000.004 | BEING STOPPED | DD-DD-DD-DD-DD |

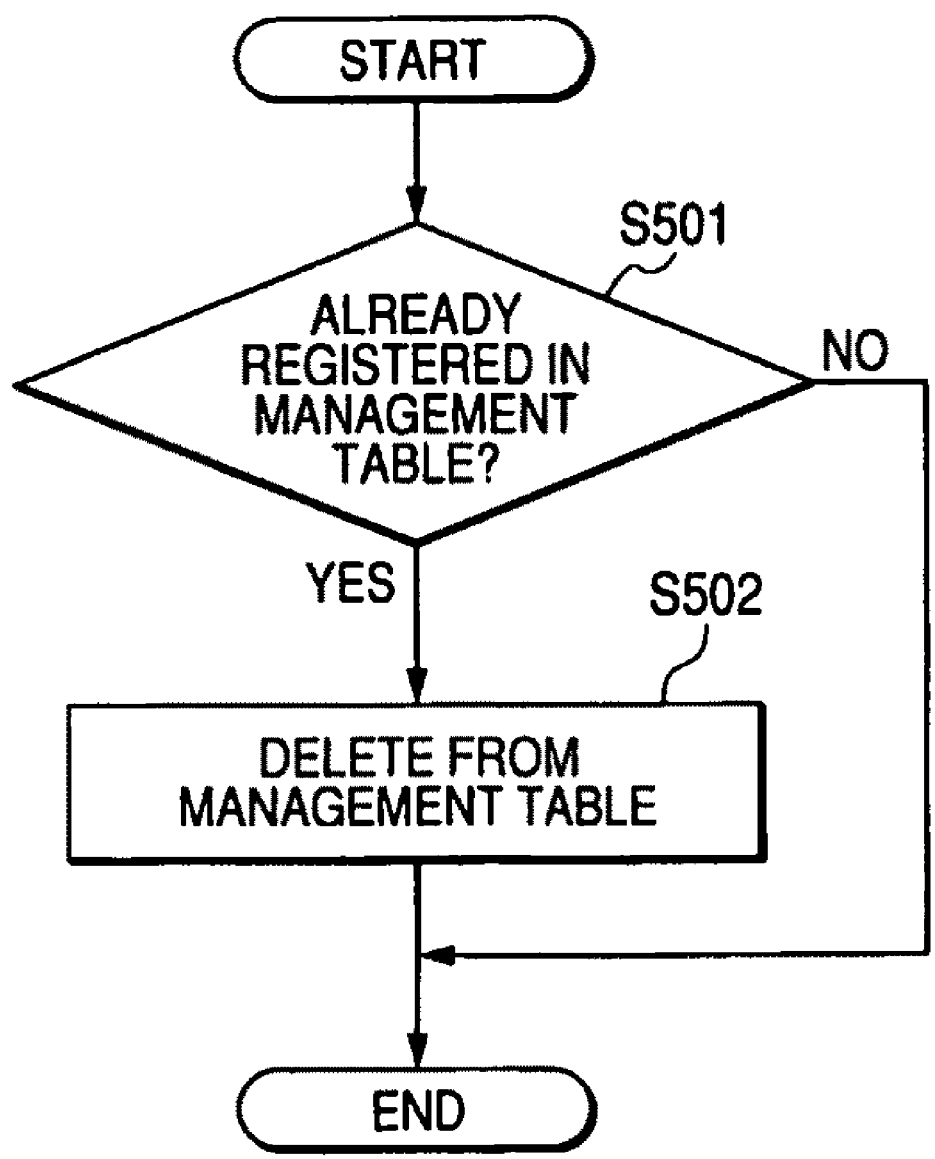

COMMUNICATION CONTROL APPARATUS

TECHNICAL FIELD

The present invention relates to a communication control apparatus, and more particularly to a communication control apparatus that communicates with and supplies electric power to an external apparatus connected via a power line.

BACKGROUND ART

Conventionally, in the electrical apparatuses for use in the home, various technologies are used to reduce electricity consumption. For example, a function of automatically shutting down the power when an electric apparatus is not in use, and a function such as a low power mode of reducing the electricity consumption than during normal operation are known.

In recent years, there has been proposed a technology for connecting the electrical apparatus in the home to a network and controlling each apparatus through communication over the network.

As a technology for realizing such network for the home, a Power Line Communication (PLC) has been noteworthy. The PLC means a system for attaining the bidirectional communication using the power line as a transmission path by superimposing a high frequency signal on the existent power line of 100 V (50/60 Hz) (e.g., refer to Japanese Patent Application Laid-Open No. 2004-7497).

In the PLC, the existent power incoming line, a socket (electrical outlet) or a plug can be directly used, whereby new wiring works are unnecessary. Also, the PLC can be connected simply by inserting the plug into the socket, whereby plug and play is permitted without needing the complex settings.

In the case where an electrical apparatus in the home is connected to each other via the network such as the PLC, to be controlled, it is required that a circuit for receiving a control signal from the network is operable at any time in each apparatus.

Therefore, the standby power consumed while the power is off is increased, resulting in a problem that the total electricity consumption is increased.

DISCLOSURE OF THE INVENTION

It is an aspect of the invention to solve the above-mentioned problems, and to reduce electricity consumption by appropriately controlling the communication with and power supply to the connected apparatus.

According to an aspect of the invention, a communication control apparatus of the present invention comprises: a first connection unit connecting to a power line; a second connection unit to which an external apparatus is connected; a power supply unit which supplies electric power to the external apparatus via the second connection unit; a communication unit which makes the communication between a communication apparatus connected to the power line and the external apparatus via the first connection unit and the second connection unit; and a control unit which controls the power supply unit to supply electric power to the external apparatus, based on information received from the external apparatus by the communication unit.

According to another aspect of the invention, a communication control apparatus comprises: a first connection unit connecting to a power line; a second connection unit to which an external apparatus is connected; a power supply unit which supplies electric power to the external apparatus via the second connection unit; a communication unit which makes the communication between a communication apparatus connected to the power line and the external apparatus via the first connection unit and the second connection unit; and a control unit which controls the communication unit to stop an operation thereof for communicating with the external apparatus and controlling the power supply unit to supply electric power to the external apparatus, if the external apparatus connected to the second connection unit can not be communicated through the communication unit. Further features and aspects of the present invention will become apparent from the following detailed description of exemplary embodiments with reference to the attached drawings.

BRIEF DESCRIPTION OF THE DRAWINGS

FIG. 3 is a flowchart illustrating a process for connecting an external apparatus;

FIG. 4 is a view illustrating a power management table and a supply condition table;

FIG. 5 is a flowchart illustrating a process for removing the external apparatus;

BEST MODE FOR CARRYING OUT THE INVENTION

The exemplary embodiments of the present invention will be described below in detail with reference to the drawings.

Figure 1:
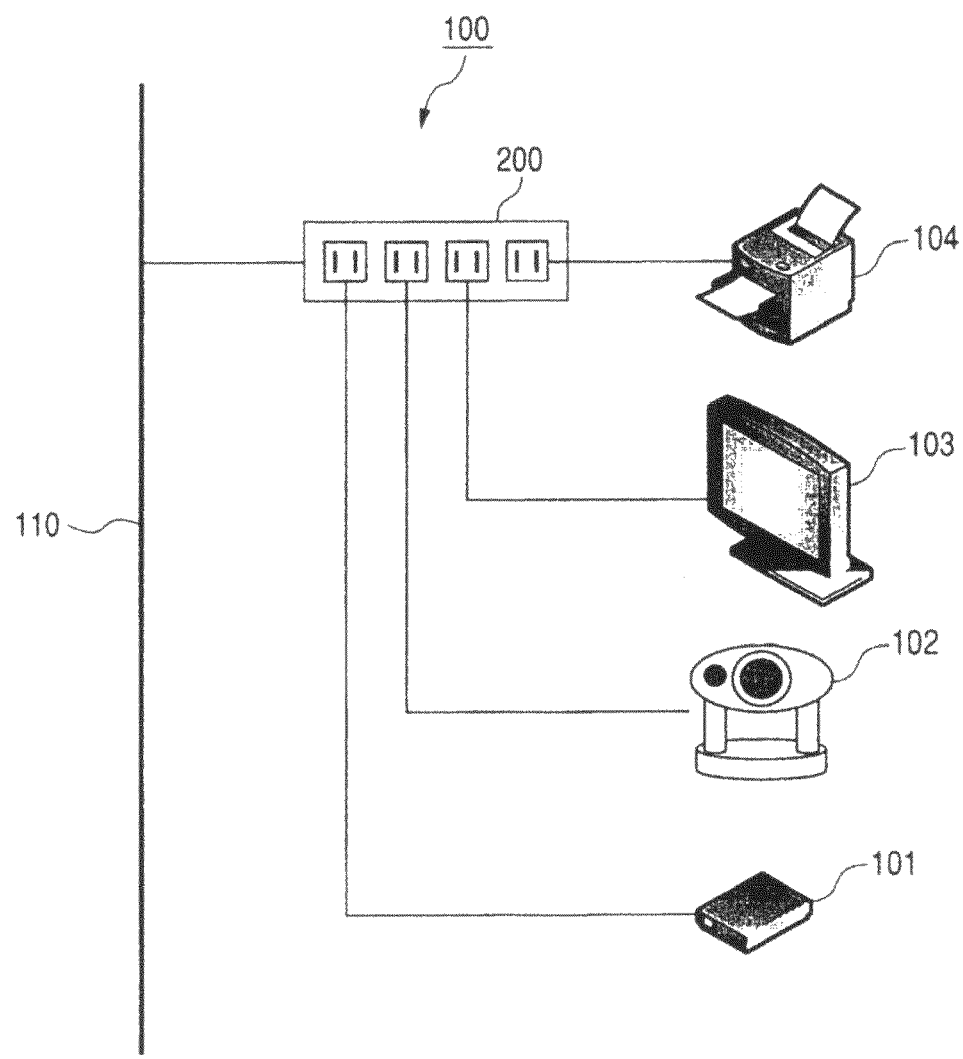
FIG. 1 is a diagram illustrating a power line communication system according to the present invention.

FIG. 1 shows the configuration of a home communication system 100 using a PLC according to an embodiment of the invention.

In the communication system 100 of FIG. 1, a table tap 200, to which a communication apparatus of the invention is applied, is connected to a power line 110 in the home. The table tap 200 has a plurality of power plug sockets, and supplies electric power to external apparatuses (101-104) connected into the socket. Also, the table tap 200 allows the communication conforming to PLC between the external apparatuses (101-104) connected into the socket and the communication apparatus connected to the power line. The communication accords with an IP (Internet Protocol) without specifying the individual protocol.

Figure 2:
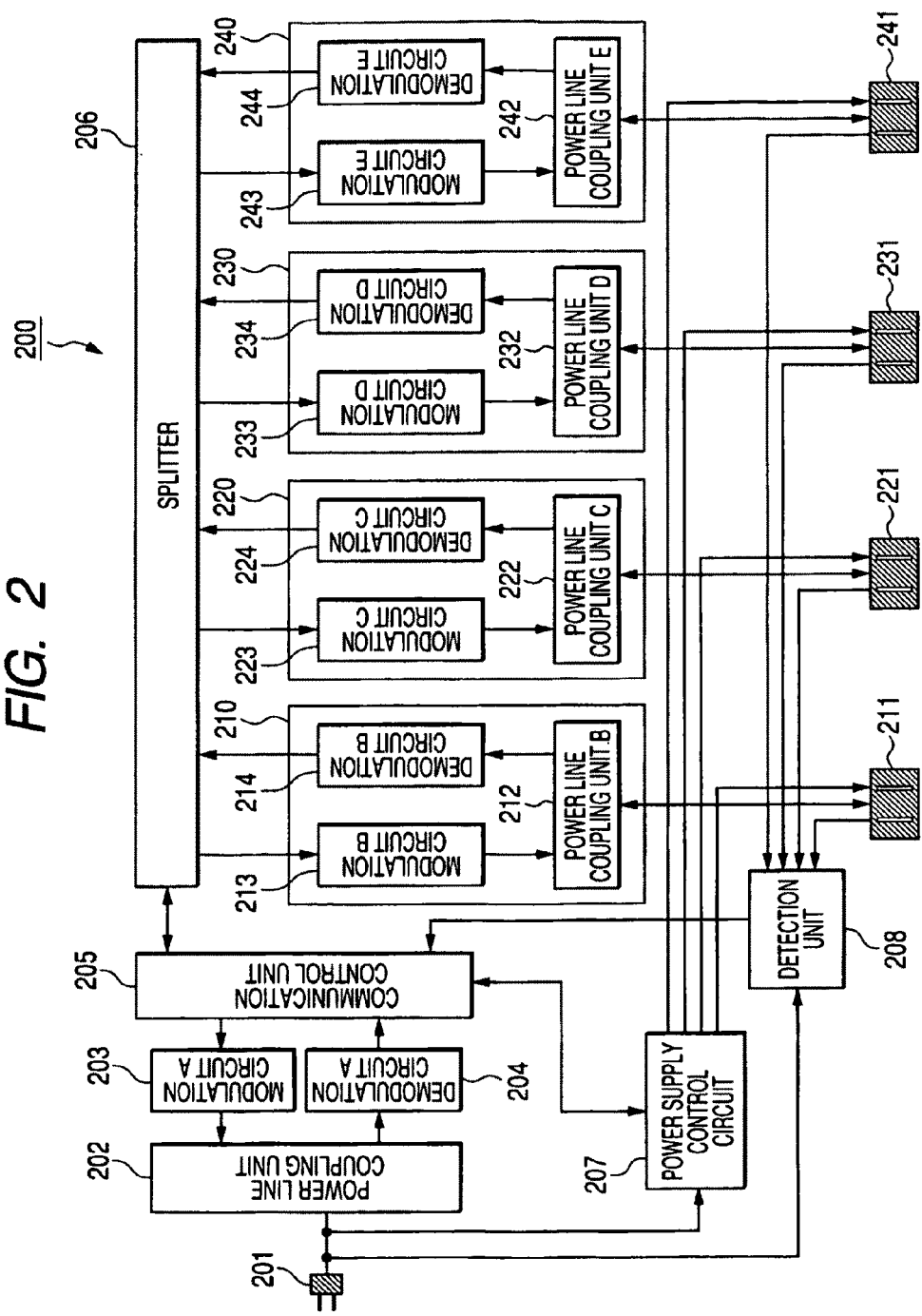
FIG. 2 is a diagram illustrating the configuration of a communication apparatus according to an embodiment.

FIG. 2 is a block diagram showing the schematic configuration of the power table tap 200.

In FIG. 2, a power plug 201 is inserted into the plug socket in the home. An electric power, on which information for communication conforming to PLC via the power plug 201 is superimposed, is supplied to a power supply control circuit 207 and a power line coupling unit 202. The power line coupling unit 202 has a function of receiving communication information superimposed on the power line from the power plug 201, and superimposing communication information on the power line. That is, in receiving a signal from the power line 110, the power line coupling unit 202 sends the received communication information to a demodulation circuit 204. Also, in sending a signal to the power line 110, the power line coupling unit 202 outputs the communication information from a modulation circuit 203 via the plug 201.

The communication information from the power line coupling unit 202 is converted into digital data by the demodulation circuit 204 and sent to a communication control unit 205.

The demodulation circuit 204 includes a bandpass RX filter removing the signal outside a predetermined band, an AD converter for adjusting the received signal level, sampling the signal at a predetermined interval, and converting it into digital data, and a demodulation unit which demodulates digital data.

Also, the modulation circuit 203 includes a bandpass TX filter for modulating digital data from the communication control unit 205, converting the modulation digital data into an analog signal, amplifying the converted signal, and removing unwanted frequency components.

The communication control unit 205 is the control unit which controls the communication in according with an IP communication method to allow the communication with an apparatus connected into each of the sockets 211, 221, 231 and 241. Also, the communication control unit 205 contains a CPU, a memory and a ROM, whereby a program can be run.

The communication control unit 205 is connected to a control unit having a routing function called a splitter 206. The splitter 206 discriminates the socket at which the apparatus is connected to communicate, and selects a circuit for use in communication from among the communication circuits 210 to 240.

The configuration of the modulation circuits B213 to E243 is the same as that of the modulation circuit 203, and the configuration of the demodulation circuit B214 to E244 is the same as that of the modulation circuit 204. Also, the power line coupling units B212 to E242 are the same as the power line coupling unit A202. Also, the modulation circuits 213 to 243, the demodulation circuits 214 to 244, and the power line coupling units 212 to 242 are configured to make the communication with the apparatus connected into each of the sockets 211 to 241.

Also, the modulation circuit B213, the demodulation circuit B214 and the power line coupling unit B212 provide a communication circuit B210 for making the communication with the apparatus connected into the socket B211. Also, the modulation circuit C223, the demodulation circuit C224 and the power line coupling unit C222 provide a communication circuit C220 for making the communication with the apparatus connected into the socket C221. Also, the modulation circuit D233, the demodulation circuit D234 and the power line coupling unit D232 provide a communication circuit D230 for making the communication with the apparatus connected into the socket D231. Also, the modulation circuit E243, the demodulation circuit E244 and the power line coupling unit E242 provide a communication circuit E240 for making the communication with the apparatus connected into the socket E241.

The power supply control circuit 207 controls the power supply to the apparatus connected into each of the sockets 211 to 241 upon an instruction from the communication control unit 205. A detection unit 208 detects whether or not the plug of the external apparatus is inserted into each of the sockets 211 to 241. And when the plug is inserted or extracted, event information indicating each operation is notified to the communication control unit 205.

In the present embodiment, it is possible to control whether each of the communication circuits B210 to E240 performs the operation of the circuit, independently. That is, the communication operation is stopped by stopping the supply of power to the communication circuit corresponding to the socket into which the power plug is not inserted among the communication circuits 210 to 240.

Also, the power supply to the socket into which the power plug is not inserted among the sockets 211 to 241 is stopped. Also, when the power plug is not inserted into any of the sockets 211 to 241, the operation of the splitter 220 is stopped and the power supply to the splitter 220 is stopped.

Next, the control operation of power supply to the external apparatus with the table tap 200 of FIG. 2 will be described below.

First of all, a process where the power plug of the external apparatus is inserted into any of the sockets 211 to 241 of FIG. 2 will be described below. In the present embodiment, it is supposed that the power plug of the external apparatus incapable of PLC communication, as well as the external apparatus with the communication function supporting the PLC, can be inserted into the socket.

FIG. 3 is a flowchart showing a process for the communication control unit 205 when the power plug of the external apparatus is inserted.

The detection unit 208 of FIG. 2 detects that the power plug of the external apparatus is inserted into any of the sockets 211 to 241, and event information indicating that the plug is inserted is supplied to the communication control unit 205, whereby the flow of FIG. 3 is started.

The communication control unit 205 stores information indicating whether or not electric power is supplied to each of the sockets 211 to 241 in an internal memory. And the power supply control circuit 207 starts the power supply to the socket into which the plug is inserted. Also, if the power supply to the communication circuit corresponding to the socket into which the plug is inserted among the communication circuits 210 to 240 is stopped, the communication function is validated after supplying the power (S301).

Also, if the power supply to the splitter 220 remains being stopped, the power supply to the splitter 220 is started and the function is validated.

Figure 8:
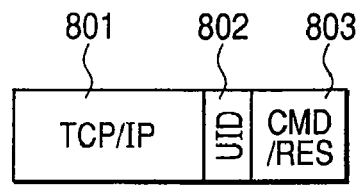
FIG. 8 is a view illustrating the format of a communication command.
Figure 9:
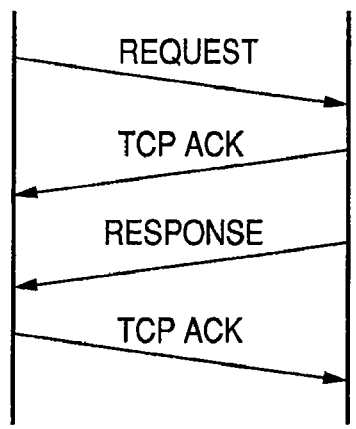
FIG. 9 is a view illustrating the communication operation.

Then, a predetermined command is sent to the connected external apparatus by the communication circuit corresponding to the socket into which the plug is inserted, and it is discriminated whether or not the apparatus can make the communication according to PLC (S302). Herein, any protocol can be used for communication, as far as the same method is employed between the apparatuses. In the present embodiment, it is assumed that a protocol for notification is defined on a TCP/IP. This protocol has a simple configuration of request and response, as shown in FIG. 9, in which both employ the same packet configuration. FIG. 8 is a data organization example for the notification protocol, comprising a header part 801 for the TCP/IP, a UID part 802 for identifying the protocol, and a command part 803 for representing the kind of request or response.

Herein, a command value requesting the transmission of a MAC (Media Access Control) address of the connected apparatus is appended to the command part 803 and sent, for example. And it is possible to discriminate whether or not there is a response from the connected apparatus within a predetermined time. If a response including the MAC address is sent within the predetermined time from the external apparatus, this external apparatus is determined as the PLC support apparatus.

Such command is sent via the modulation circuit and the power line coupling unit in the communication circuit corresponding to the socket into which the plug is connected to the external apparatus. A response to the sent command is sent back via the power line coupling unit, the demodulation circuit and the splitter 206 in the communication circuit corresponding to the socket into which the plug is connected to the communication control unit 205.

In the case where the connected apparatus is the PLC support apparatus, information on the conditions for power control is further acquired from the connected apparatus. Herein, the description is given, supposing that an HDD 101 of FIG. 1 is connected into the socket B211.

To acquire the information on the conditions for power control from the connected apparatus, a command value of data acquisition is set in the command part 803 of FIG. 8 and sent to the connected apparatus. The send data is generated by the communication control unit 205, and sent via the modulation circuit B213, the power line coupling unit B212 and the socket B211 to the connected apparatus by the splitter 206.

Figure 10:
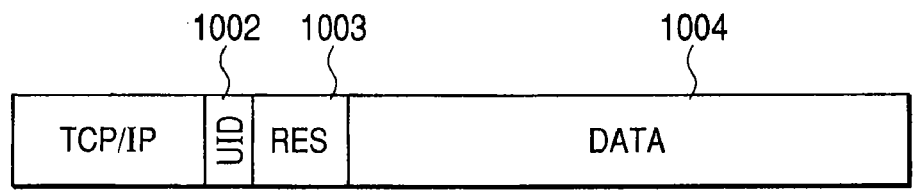
FIG. 10 is a view illustrating the format of a communication command.

The connected apparatus receiving the command sends back the information regarding the power control as the response, if having any such information. The organization of response data is shown in FIG. 10. The response data is in the form of the organization of FIG. 8 to which a data part 1004 is appended, as shown in FIG. 10. The response data is sent via the socket B211, the power line coupling unit B212, the demodulation circuit B214 and the splitter 206 to the communication control unit 205.

On the other hand, if the connected apparatus does not have the information regarding the power control, the response data of FIG. 10 is not sent from the connected apparatus.

Therefore, the process is ended by detecting that there is no response data for a predetermined time, or by receiving the data with a response value indicating that there is no information regarding the power control appended in the response part 1003 of FIG. 10, from the connected apparatus.

In this way, it is discriminated whether or not the information regarding the power control can be acquired (S303), and if the information can be acquired, the acquired information is stored as a power management table in the memory within the communication control unit 205 (S304). An example of the power management table is shown in FIG. 4.

Reference numeral 400 of FIG. 4 denotes the power management table.

The power management table 400 has a plurality of items for power control. First of all, the power management table 400 includes a port 401 indicating each socket and an apparatus name 402 listing the connected apparatus connected to each socket.

Moreover, the power management table 400 includes the controllability information 403 indicating whether or not the connected apparatus is operable upon a control instruction from an external power control apparatus.

Also, the power management table 400 includes the off-timer information 404 indicating a period from appearance of no communication with other apparatuses until power supply can be stopped. This off-timer information 403 indicates off-timer present and absent, and if the off-timer is present, the time information is included.

Also, the power management table 400 includes the power supply stop condition information 405 indicating whether the power supply to the apparatus should be stopped after sending information notifying the stop of power supply or may be stopped without notifying the stop of power supply. If the power supply is stopped after sending the information notifying the power off, the power supply stop condition information 405 includes the timer information after request.

Some apparatuses may be desirably operated by regular power supply. For example, if a printer has not been operated for a long time, clogging of an ink head may occur. For such apparatuses, the information 406 indicating whether or not regular power supply is required is included. Herein, if the regular power supply is required, the time information indicating the interval at which power supply is required is included.

Also, the power supply may be stopped based on event information from another apparatus connected to the network of PLC. Thus, the end notification presence or absence information 407 is included.

In FIG. 4, for explanation, each entry is represented in sentence, but actually by a predetermined value in binary number because of digital data.

In the present embodiment, a supply condition table indicating the condition of power supply to each connected apparatus is generated or updated, in addition to the power management table 400 at S304.

The communication control unit 205 has a router function, in which an IP address is assigned to each external apparatus connected. And the supply condition table is generated based on the IP address assigned to each apparatus, and the MAC address of each apparatus.

Reference numeral 420 of FIG. 4 denotes a supply condition table.

In the supply condition table 420, reference numeral 421 denotes a connection port, reference numeral 422 denotes the IP address of connected apparatus at each socket, and reference numeral 423 denotes the condition of power supply to each connected apparatus. Reference numeral 424 denotes the MAC address of each apparatus. The communication control unit 205 stores the supply condition table 420 in the internal memory.

After generating or updating the power management table 400, it is discriminated for the connected apparatus newly added to the power management table 400 at this time whether or not the off-timer time is set based on the off-timer information 403 (S305). If the off-timer is set, the internal timer is reset, and count thereof is started (S306). That is, at the time when the external apparatus is newly connected, the timer for turning off the power supply is started to count.

Also, if the connected apparatus is the PLC support apparatus, but the power control information is not sent at S303, the power management table is not generated or updated, but only the supply condition table is updated and the process is ended (S308). Also, if the off-timer is not set at S305, the process is directly ended.

Also, if the connected apparatus does not support the PLC at S302, the power is wasted if the function of the communication circuit corresponding to the socket into which the apparatus is connected is valid.

Thus, if the connected apparatus does not support the PLC, the power supply to the communication circuit corresponding to the socket into which the apparatus is newly connected is stopped and its function is stopped (S307). Herein, if the external apparatus is not connected to any of the sockets, the function of the splitter 206 is also stopped because the routing function is meaningless.

Next, a process where the power plug of the external apparatus connected to any of the sockets 211 to 241 of FIG. 2 is extracted will be described below. FIG. 5 is a flowchart showing a process for the communication control unit 205 where the power plug of the external apparatus is extracted.

The detection unit 208 of FIG. 2 detects that the plug is removed from any of the sockets 211 to 241, and the event information indicating the removal is supplied to the communication control unit 205, whereby the flow of FIG. 4 is started.

First of all, it is discriminated whether or not the apparatus extracted at this time supports the PLC, and registered in the power management table 400 and the supply condition table 420 of FIG. 4 (S501). Specifically, it is detected which of the sockets 211 to 241 the plug is removed from.

If the apparatus is registered in the management table, information on the removed apparatus is deleted from the power management table 400 and the supply condition table 420 of FIG. 4 (S502). Also, if the removed apparatus does not support the PLC, the process is directly ended.

Figure 6:
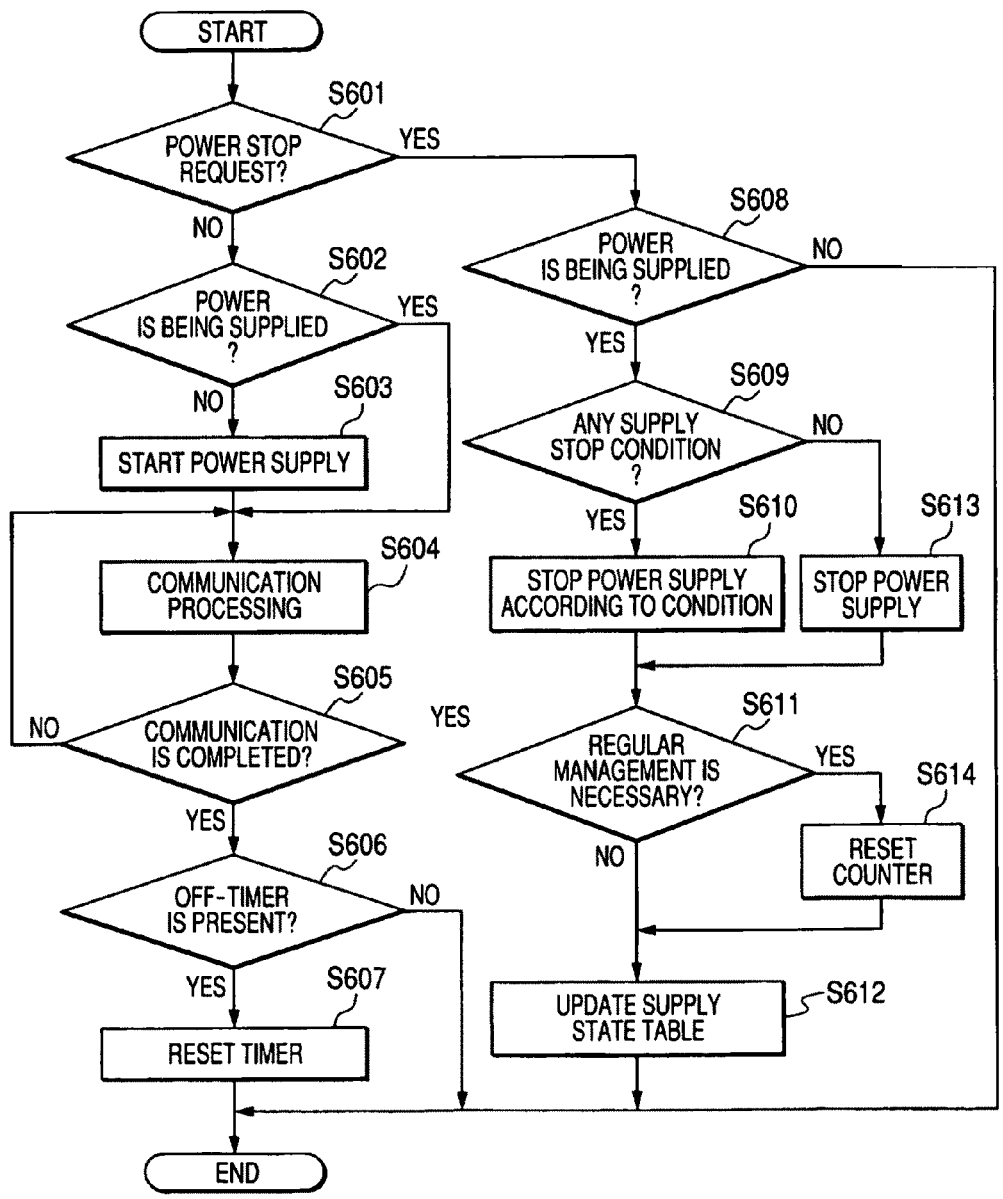
FIG. 6 is a flowchart illustrating a process for receiving information.

Next, a process where there is an external communication request to the PLC support apparatus connected to the table tap 200 as previously described will be described below. FIG. 6 is a flowchart showing the operation of the communication control unit 206 when there is a communication request.

The communication control unit 206, receiving communication information via the power plug 201 from the power line 110, discriminates whether or not the received information is sent to the apparatus connected at any of the sockets 211 to 241. And if the information is sent to any connected apparatus, it is discriminated whether or not the received information is a power stop request (S601).

If the received information is not the power stop request, the power supply condition of the apparatus to which the information received at this time is sent is detected, based on the supply condition table 420 of FIG. 4. And it is discriminated whether or not the apparatus is in the power supply condition (S602). If the apparatus is supplying power, the process is directly continued.

Also, if the apparatus is in the power supply stop condition, the power supply to the apparatus of sending destination is started by the power supply control circuit 207 (S603). And the received information is sent via the splitter 206 and the communication circuit corresponding to the socket at which the apparatus of sending destination is connected (S604). If the communication is ended (S605), it is discriminated whether or not the setting of the off-timer 404 is present for the apparatus that communicates at this time, based on the power management table 400 (S606). If the setting of the off-timer is present, the internal timer is reset, and count thereof is started (S607). That is, at the time when the communication is newly made, the timer for turning off the power supply is started to count.

Also, if the setting of the off-timer is not present, the process is directly ended.

Also, if the received information is the power stop request at S601, the power supply condition of the apparatus to which the information received at this time is sent is detected, based on the supply condition table 420 of FIG. 4. And it is discriminated whether or not the apparatus is in the power supply condition (S608). If the power supply is in a stop state, the process is directly ended.

Also, if the power is being supplied, it is discriminated whether or not the power supply stop condition is set according to the power supply stop condition 405 of the power management table 400 (S609). If the stop condition is not set, the power supply to the socket at which the apparatus to send the power stop request is connected is stopped (S613). On the other hand, if the power supply stop condition is set, a power supply stop request is sent to the apparatus of sending destination according to the stop condition, and further after the passage of a time specified in the condition, the power supply to the corresponding socket is stopped (S610).

For example, after sending a shutdown request appended in the command part 1003 as shown in FIG. 10, the judgment may be made by receiving data including a response code indicating ACK in the command part 1003 in FIG. 10 from the connected apparatus.

In this way, after the power supply is stopped, it is discriminated whether or not the apparatus to which the power supply is stopped at this time requires the regular power supply, based on the information 406 of the power management table 400 (S611).

If the regular power supply is required, the timer is reset and started to count the period up to the power supply at the next time (S614).

Also, if the regular power supply is not required, the content of the information 423 of the power supply condition on the apparatus for which the power supply is stopped at this time is changed in the supply condition table 420, and the process is ended (S612).

The processes as described with reference to the flowcharts of FIGS. 3, 5 and 6 are performed irregularly.

Next, the control operation for power supply that is regularly performed will be described below.

Figure 7:
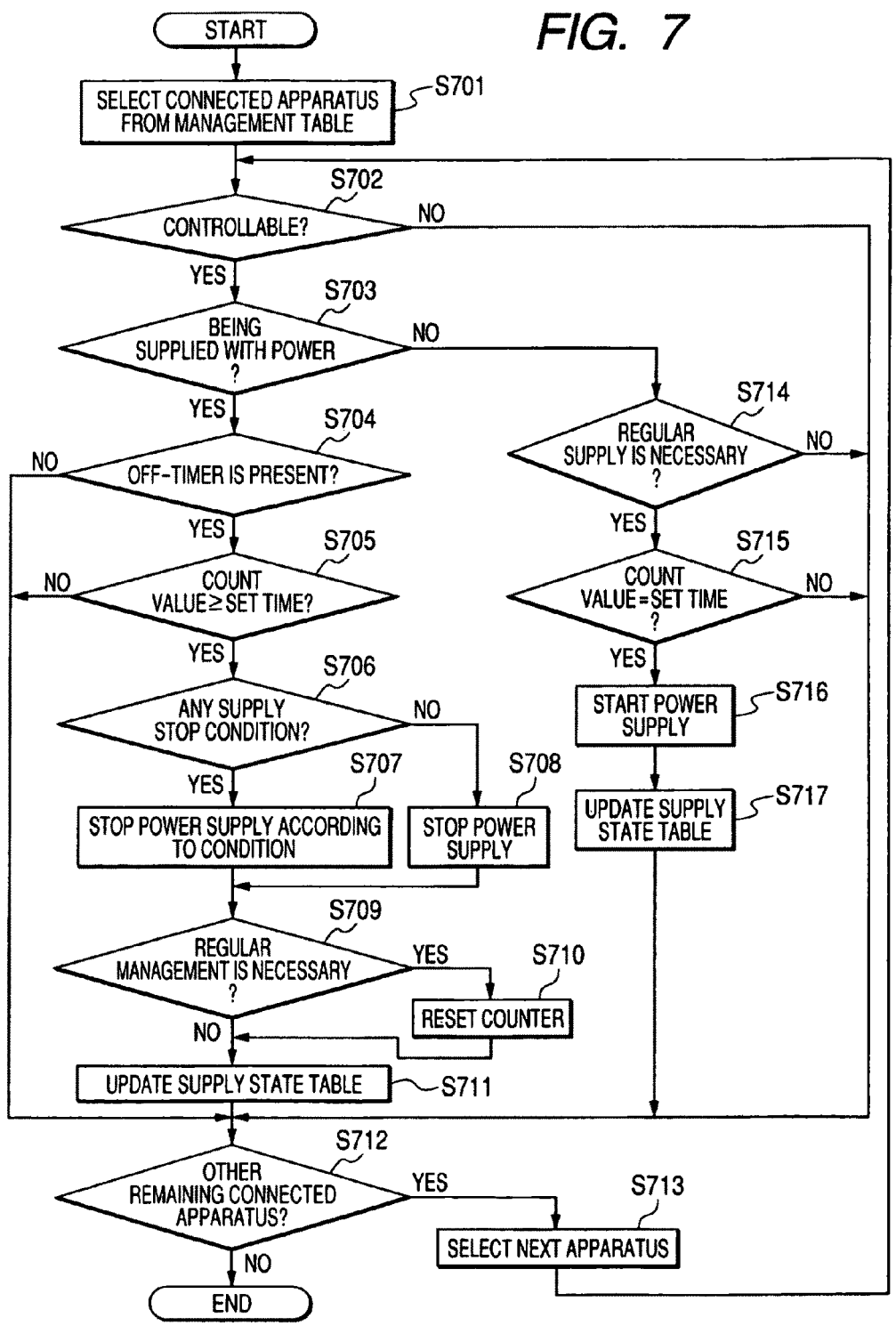
FIG. 7 is a flowchart illustrating a control process for power supply.

FIG. 7 is a flowchart showing a control process for power supply according to the present embodiment. The process of FIG. 7 is performed by a CPU of the communication control unit 205 controlling each unit. Also, the process of FIG. 7 is regularly performed at a predetermined timing.

First of all, one connected apparatus is selected from the power management table 400 of FIG. 4 (S701). And it is discriminated whether or not the power supply to the selected connected apparatus is controllable (S702). If the power supply to the selected connected apparatus is not controllable, the process advances to S712. On the other hand, if the power supply to the selected connected apparatus is controllable, it is discriminated whether or not the selected apparatus is being supplied with power, based on the supply condition table 420 (S703).

If the selected apparatus is being supplied with power, it is discriminated whether or not the setting of the off-timer is present, based on the off-timer information 404 of the power management table 400 (S704). If the setting of the off-timer is not present, the process advances to S712. On the other hand, if the setting of the off-timer is present, it is discriminated whether or not the count value of the off-timer is greater than or equal to a set value (S705). If the count value is less than the set value, the process advances to S712.

On the other hand, if the count value of the off-timer is greater than or equal to the set value, it is discriminated whether or not the power supply stop condition is set, based on the stop condition 405 of the power management table 400 (S706). If the power supply stop condition is set, a power supply stop request is sent to the apparatus of sending destination according to the stop condition, and further after the passage of a time specified in the condition, the power supply to the corresponding socket is stopped (S707). On the other hand, if the stop condition is not set, the power supply to the socket at which the apparatus of a sending destination of the power stop request is connected is stopped (S708).

After the power supply is stopped, it is discriminated whether or not the apparatus to which the power supply is stopped at this time regularly requires the power supply, based on the information 406 of the power management table 400 (S709). If the power supply is regularly required, the timer is reset and started to count the period up to the power supply at the next time (S710).

Also, if the power supply is not regularly required, the content of the power supply condition information 423 on the apparatus to which the power supply is stopped at this time is changed in the supply condition table 420 (S711).

And it is discriminated whether or not the process is ended for all the apparatuses registered in the power management table 400 (S712), and if there is remaining apparatus, the next apparatus is selected and the process returns to S702 (S713).

Also, if the power supply to the selected apparatus is stopped at S703, it is discriminated whether or not the power supply is regularly required (S714). If the power supply is not regularly required, the process advances to S712. On the other hand, if the power supply is regularly required, it is discriminated whether or not the count value since the power supply is stopped at the previous time is greater than or equal to a set value (S715). If the count value is less than the set value, the process advances to S712. On the other hand, if the count value is greater than or equal to the set value, the power supply to the socket at which the selected apparatus is connected is started (S716). And the content of the power supply condition information 423 on the apparatus to which the power supply is started at this time is changed in the supply condition table 420 (S717).

The table tap 200 of FIG. 2 is used by inserting the power plug 201 into the socket in the home. Therefore, the power plug 201 may be extracted while the external apparatus is connected at each of the sockets 211 to 241 for the power plug 201.

Referring to a flowchart of FIG. 11, a process where the power plug 201 is extracted will be described below. In the present embodiment, a battery (not shown) for making the system operable for a certain time after the power plug 201 is extracted is built in. And after the power plug 201 is extracted, the system operates owing to electric power of this built-in battery.

Figure 11:
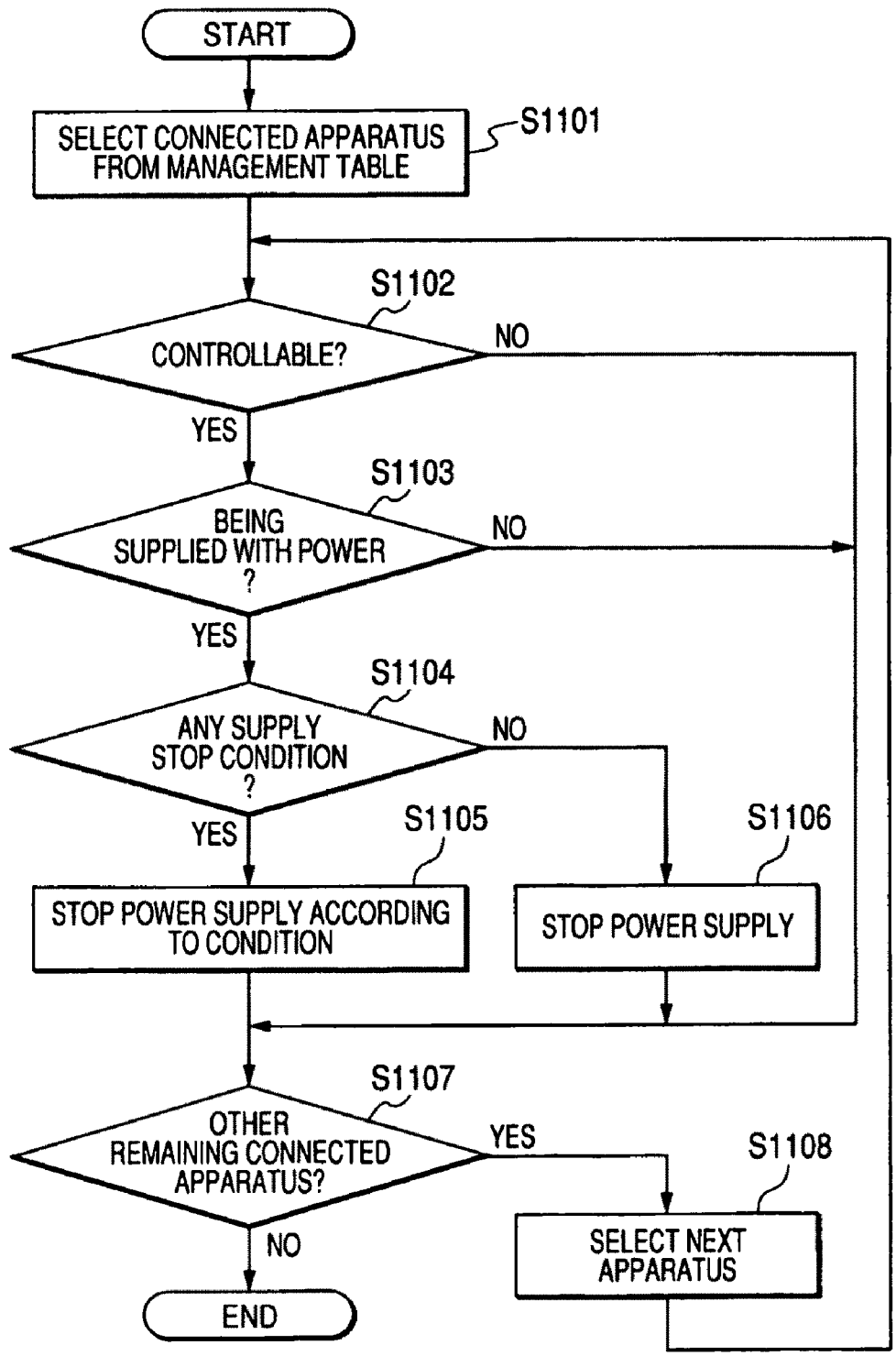
FIG. 11 is a flowchart illustrating the operation when a power plug is removed.

If the detection unit 208 detects that the power plug 201 is extracted, the process of FIG. 11 is started. The process of FIG. 11 is performed under the control of the communication control unit 205 of FIG. 2.

First of all, one connected apparatus is selected from the power management table 400 of FIG. 4 (S1101). And it is discriminated whether or not the power supply to the selected connected apparatus is controllable (S1102). If the power supply to the selected connected apparatus is not controllable, the process advances to S1107. On the other hand, if the power supply to the selected connected apparatus is controllable, it is discriminated whether or not the selected apparatus is being supplied with power, based on the supply condition table 420 (S1103).

If the apparatus is not being supplied with power, the process advances to S1107. On the other hand, if the apparatus is being supplied with power, it is discriminated whether or not the power supply stop condition is set based on the stop condition 405 of the power management table 400 (S1104). If the power supply stop condition is set, a power supply stop request is sent to the apparatus of sending destination, according to the stop condition, and further after the passage of a time specified in the condition, the power supply to the corresponding socket is stopped (S1105). On the other hand, if the stop condition is not set, the power supply to the socket at which the apparatus to send the power stop request is connected is stopped (S1106).

And it is discriminated whether or not the process is ended for all the apparatuses registered in the power management table 400 (S1107), and if there is remaining apparatus, the next apparatus is selected and the process returns to S1102 (S1108).

As described above, with the embodiment, the information for power control is acquired from the external apparatus connected to the table tap 200, and the power supply to each apparatus is controlled based on this information for power control.

Therefore, when the communication according to PLC is performed, it is possible to reduce the standby power appropriately according to each apparatus.

Also, in the present embodiment, if the connected apparatus does not support the PLC, the power supply to the communication circuit is stopped and the operation of the circuit is stopped, whereby the wasteful standby power in the table tap 200 can be reduced.

Though the power management table 400 and the supply condition table 420 are stored as different tables in the memory in the present embodiment as shown in FIG. 4, they may be integrated into one table.

Thus, in the present embodiment, information on the stop condition for power supply is received from the apparatus connected to the table tap. And if there is no communication for a certain period according to the stop condition, the power supply to the connected apparatus is stopped.

Therefore, it is possible to reduce electricity consumption by adequately controlling the communication with and the power supply to the connected apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-182953, filed Jul. 12, 2007, which is hereby incorporated by reference herein in its entirety.

The invention claimed is:

1. A communication control apparatus comprising:
 a first connection unit that is connected to a power line;
 a second connection unit that is connected to an external apparatus;
 a detection unit that detects whether or not the external apparatus is connected to the second connection unit;
 a power supply unit that supplies power to the external apparatus via the second connection unit;
 a communication unit that communicates with a communication apparatus connected to the power line via the first connection unit and communicates with the external apparatus via the second connection unit; and
 a control unit that (a) controls the power supply unit to supply power to the external apparatus based on information relating to conditions for supplying power if the external apparatus is connected to the second connection unit, (b) controls the power supply unit to stop supplying power to the external apparatus if the external apparatus connected to the second connection unit is a first device and a predetermined request is received via the first connection unit, (c) controls the power supply unit not to stop a supply of power to the external apparatus until a predetermined time elapses after the predetermined request is received via the first connection unit if the external apparatus connected to the second connection unit is a second device, and (d) controls the power supply unit to stop supplying power to the external apparatus after the predetermined time elapses if the external apparatus connected to the second connection unit is a second device and the predetermined request is received via the first connection unit, wherein the predetermined request includes a request for requesting stopping power.

2. The communication control apparatus according to claim 1, further comprising a plurality of the second connection units respectively to which external apparatuses are connected, wherein the power supply unit supplies power to a plurality of external apparatuses connected to the plural second connection units, wherein the communication unit communicates with the plurality of external apparatuses via the plural second connection units, and wherein the control unit controls to supply electric power to the plurality of external apparatuses based on the information.

3. The communication control apparatus according to claim 1, wherein the information includes information indicating condition for stopping supplying power and information indicating condition for starting supplying power.

4. The communication control apparatus according to claim 1, wherein the information includes information indicating whether or not a supply of power to the external apparatus can be stopped.

5. The communication control apparatus according to claim 1, wherein the control unit includes a memory for storing information relating to conditions received by the communication unit, and deletes information relating to the conditions corresponding to a removed external apparatus from the memory if it is detected that the external apparatus connected to the second connection unit is removed.

6. The communication control apparatus according to claim 1, wherein the first connection unit includes a plug, and wherein if the plug is removed from a socket leading to the power line, the control unit controls the power supply unit to stop supplying power to the external apparatus based on the information.

7. The communication control apparatus according to claim 1, wherein the communication control apparatus includes a table tap.

8. The communication control apparatus according to claim 1, wherein the communication unit communicates with the communication apparatus by using Power Line Communication (PLC).

9. The communication control apparatus according to claim 1, wherein the communication unit communicates with the external apparatus by using Power Line Communication (PLC).

10. The communication control apparatus according to claim 1, wherein the communication unit communicates with the communication apparatus by using Internet Protocol (IP).

11. The communication control apparatus according to claim 1, wherein the communication unit communicates with the external apparatus by using Internet Protocol (IP).

12. The communication control apparatus according to claim 1, further comprising a storing unit that stores an IP address relating to the external apparatus and MAC address relating to the external apparatus in a memory if the external apparatus is connected to the second connection unit.

13. The communication control apparatus according to claim 1, wherein the information includes information indicating whether or not the communication unit transmits information for notifying stopping power supply to the external apparatus connected to the second connection unit.

14. A method of controlling a communication control apparatus, wherein the communication control apparatus includes a first connection unit that is connected to a power line and a second connection unit that is connected to an external apparatus, the method comprising:
    detecting whether or not the external apparatus is connected to the second connection unit;
    communicating with a communication apparatus connected to the power line via the first connection unit;
    communicating with the external apparatus via the second connection unit;
    supplying power to the external apparatus based on information relating to conditions for supplying power if the external apparatus is connected to the second connection unit;
    stopping supplying power to the external apparatus if the external apparatus connected to the second connection unit is a first device and a predetermined request is received via the first connection unit;
    controlling not to stop a supply of power to the external apparatus until a predetermined time elapses after the predetermined request is received via the first connection unit if the external apparatus connected to the second connection unit is a second device; and
    stopping supplying power to the external apparatus after the predetermined time elapses if the external apparatus connected to the second connection unit is a second device and the predetermined request is received via the first connection unit, wherein the predetermined request includes a request for requesting stopping power.

* * * * *